United States Patent [19]

Clark

[11] Patent Number: 4,909,470
[45] Date of Patent: Mar. 20, 1990

[54] OVERHEAD CONSOLE WITH BREAKAWAY MOUNT

[75] Inventor: Russell L. Clark, Zeeland, Mich.
[73] Assignee: Prince Corporation, Holland, Mich.
[21] Appl. No.: 254,826
[22] Filed: Oct. 7, 1988
[51] Int. Cl.4 .............................................. F16M 13/00
[52] U.S. Cl. .................................... 248/549; 248/479; 248/900
[58] Field of Search .............. 248/900, 549, 476, 479, 248/481, 483, 484; 350/635, 631, 632; 16/293

[56] References Cited

U.S. PATENT DOCUMENTS

| | | | |
|---|---|---|---|
| 2,706,307 | 4/1955 | Anderson | 16/293 |
| 3,425,657 | 2/1969 | Doyle. | |
| 3,436,049 | 4/1969 | De Claire et al. | |
| 3,471,115 | 10/1969 | Corbin. | |
| 3,575,375 | 4/1971 | Strem | 248/481 |
| 3,599,926 | 4/1971 | Takahashi. | |
| 3,703,270 | 11/1972 | Tomlin. | |
| 3,813,113 | 5/1974 | Burnham. | |
| 4,012,022 | 3/1977 | Tomita. | |
| 4,254,931 | 3/1981 | Aikens et al. | |
| 4,626,086 | 12/1986 | Ohyama. | |
| 4,668,059 | 5/1987 | Ohyama. | |
| 4,711,421 | 12/1987 | Mittelhauser. | |

FOREIGN PATENT DOCUMENTS

| | | | |
|---|---|---|---|
| 1123290 | 8/1968 | Fed. Rep. of Germany | 248/900 |
| 3001906 | 7/1981 | Fed. Rep. of Germany | 350/632 |
| 1326740 | 8/1973 | United Kingdom | 248/900 |

*Primary Examiner*—J. Franklin Foss
*Attorney, Agent, or Firm*—Price, Heneveld, Cooper, DeWitt & Litton

[57] ABSTRACT

A console assembly for a vehicular rearview mirror having breakaway capabilities includes a base adapted for attachment to an interior portion of a vehicle, a panel structure mounting the rearview mirror and an overcenter spring for securely, but releasably, holding the panel structure to the base. The base, panel structure and spring are constructed to cooperatively interact such that an impacting force acting on the mirror and having a magnitude above a predetermined level will cause said overcenter spring to release the panel structure from the base and thereby permit the rearview mirror to break away.

19 Claims, 1 Drawing Sheet

OVERHEAD CONSOLE WITH BREAKAWAY MOUNT

BACKGROUND OF THE INVENTION

The present invention pertains to vehicular mounting assembly for rearview mirrors, and in particular to a mounting assembly having a breakaway capacity.

Breakaway rearview mirrors are utilized to reduce the severity of injury for an individual who impacts it with a predetermined magnitude of force. In the past, one approach has been to attach the mirror through the use of a frangible element. An example of such a construction is disclosed in U.S. Pat. No. 3,436,049 issued Apr. 1, 1969, to DeClaire et al., and entitled BREAKAWAY MIRROR SUPPORT. However, with this construction, a new mounting assembly must be purchased and installed with every instance the mirror is broken away. This result dramatically increases the cost and time needed to reattach the mirror.

In an effort to overcome the deficiencies and problems of using a frangible mounting assembly, past artisans have developed spring biased mechanisms and/or resilient support members which act to bend or give way, but not fracture, upon impact. Examples of such constructions are disclosed in U.S. Pat. Nos. 3,471,115 issued Oct. 7, 1969, to Corbin, and entitled REARVIEW MIRROR SUPPORT; and 3,425,657 issued Feb. 4, 1969, to Doyle, and entitled VEHICLE REAR VIEW MIRROR ASSEMBLY. However, these resilient arrangements provide a less secure and steady mounting of the mirror when placed in an operative position.

SUMMARY OF THE INVENTION

In accordance with the present invention, a unique vehicular rearview mirror mounting assembly is provided which securely and steadily holds the mirror in an operative position, and yet releases the mirror upon impact without the resultant structural damage.

The mounting assembly includes a pair of rigid components which are cooperatively configured to matingly engage in the operative position to thereby provide a steady and secure base for the mirror. An overcenter spring is employed to securely hold the components together as an integral unit, while still permitting breakaway capability.

By utilizing the mounting assembly of the present invention, the mirror is held in a steady and secure manner during use, and yet still breaks away without any resulting structural damage. Further, the assembly includes a minimum of parts which increases the manufacturing efficiency and reduces the cost as compared to the many more complex units. Also, the three elements are easily and quickly reassembled without the need for tools or special training. In a preferred embodiment, the mounting assembly constitutes an overhead console.

These and other objects, advantages and features of the invention will be more readily understood and appreciated by reference to the detailed description of the preferred embodiment and the drawings.

DETAILED DESCRIPTION OF THE PREFERRED EMBODIMENT

Figure 1:
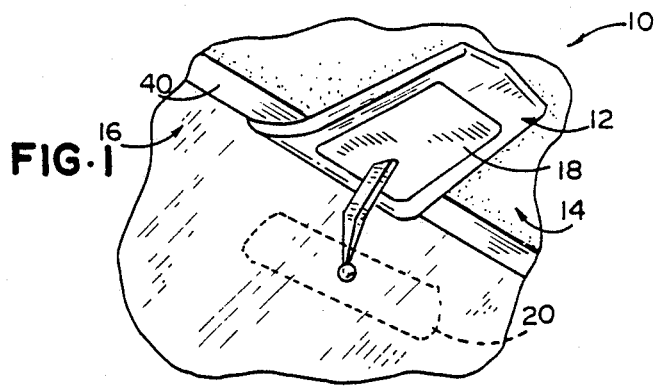
FIG. 1 is a perspective view of the vehicular rearview mounting assembly of the present invention attached to the interior of the vehicle.

In the preferred embodiment, a mounting assembly 10 includes a base 12 adapted to attach to the roof 14 of a vehicle 16, a movable panel 18 for supporting the rearview mirror 20, and an overcenter spring 22 movably coupling panel 18 to base 12 Preferably, base 12 and panel 18 are integrally molded of a rigid polymeric material such as a polycarbonate. Base 12 may constitute an overhead console including map reading lamps, an electronic compass or other vehicle electrical components such as is illustrated in U.S. Pat. No. 4,558,899. For simplification, base 12, shown in FIG. 5, is essentially a rectangular, generally planar element having an upper surface 24, a lower surface 26 and a central pocket 28 recessed in lower surface 26. The ends 30, 32 are preferably curved and shaped to more aesthetically conform to the contours of the roof or headliner 14. When assembled in vehicle 16, upper surface 24 faces headliner 14 and is unseen by the viewer.

To effect the attachment of base 12 to headliner 14, a pair of threaded fasteners 34 extend through a pair of centrally located spaced apart bores 36 and into a roof support element 37. To facilitate the positioning of base 12 in its proper location and to more effectively resist any undesirable twisting motion of base 12, upper surface 24 further includes a pair of L-shaped positioning flanges 38 adapted to engage a portion of the windshield molding 40, and a projecting stud 42 near end 32 which is adapted for receipt through a corresponding aperture 44 provided in roof element 37.

Pocket 28 is provided with a peripheral boundary wall 46 defined by a front wall 48, a rear wall 50 and a pair of opposing sidewalls 52, 54. Pocket 28 further includes a recessed face 56 which substantially parallels lower surface 26. Provided along sidewalls 52, 54 and rear wall 50 are a plurality of ledges 58 and 60, respectively, which act to engage and support panel 18 in its proper operative position. Ledges 58 are preferably elongate members which are positioned approximately centrally along sidewalls 52, 58 within pocket 28. Rear braces 60 are preferably grouped into two sets of two braces each. This arrangement of rear braces 60 is not critical for the support of panel 18, but is utilized to mount overcenter spring 22 as will be described below.

Panel 18 includes a substantially planar body 62 having a front end 64 and rear end 66. Front end 64 is slightly curved to correspond to the shape of base 12 at front end 30. Extending downwardly and forwardly from exterior face 68 of body 62 is a conventional mounting arm 70 having a distal ball 72 for adjustably mounting a rearview mirror 20 to the ball utilizing a conventional mounting system.

Body 62 further includes a peripheral rim 74 defined by a front edge 76, a rear edge 78 and a pair of opposite sides 80, 82. Peripheral rim 74 is dimensioned and shaped for mating receipt within boundary wall 64 of pocket 28. To effect the mounting of panel 18 in base 12, a pair of parallel projecting L-shaped tongues 84 are provided to extend forwardly and slightly upwardly from front edge 76. Tongues 84 are adapted for receipt within a pair of corresponding openings 86 provided in front wall 4 of pocket 28. More specifically, when panel 18 is placed in its operative position, the interior surface 92 of body 62, near side edges 80, 82 and rear edge 78, are held tightly against side braces 58 and rear braces 60, respectively, by spring 22. Moreover, tongues 84 are oriented such that their lower faces 88 abuttingly engage walls 90 (FIG. 3) partially defining openings 86. This specifically designed mounting arrangement securely and steadily supports mirror 20 in its operative position.

Figure 3:
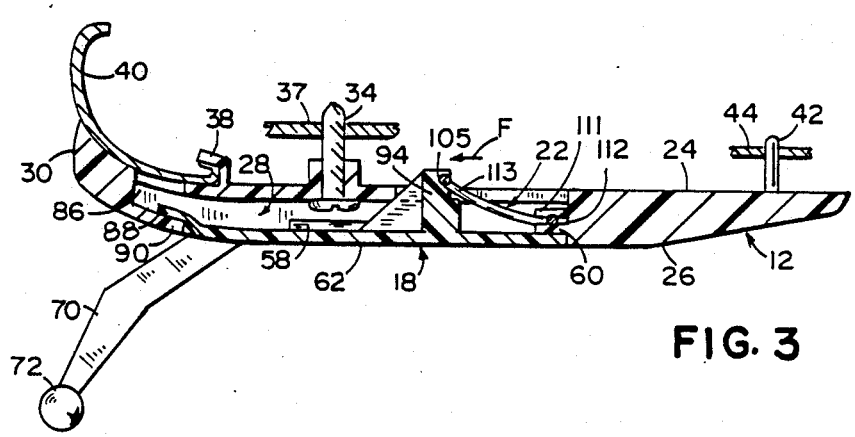
FIG. 3 is cross-sectional view of the mounting assembly taken along section line III—III in FIG. 4 and shown in an operative position.

To engage and cooperate with spring 22, the interior surface 92 of panel 18 is provided with an upwardly extending projection 94 having a depth dimension greater then the depth of pocket 28 to thereby facilitate the overcenter positioning of spring 22. To accommodate projection 94, recessed face 56 of base 12 is provided with an enlarged hole 96 through which it is passed when panel 18 is placed in its operative position as seen in FIG. 3. Projection 94 includes a rearwardly facing engagement face 101 and a pair of forwardly extending bracing ridges 103 to strengthen projection 94 and counteract the forces applied thereto by spring 22. Engagement face 101 includes a narrow transverse trough 105 which is adapted to snugly receive and hold a center portion of spring 22, as will be described below.

Figure 4:
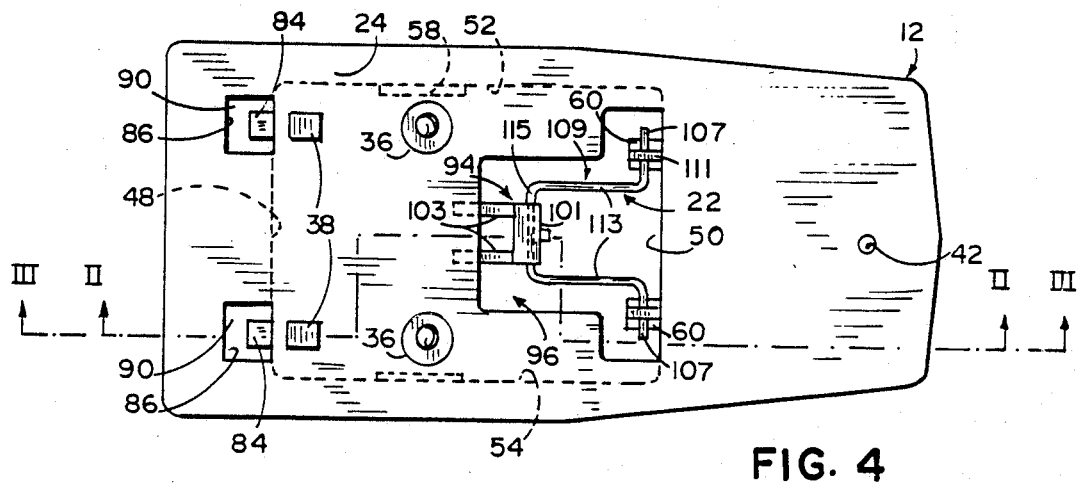
FIG. 4 is a top plan view of the mounting assembly.

Spring 22 is a compression spring constructed as an elongate wire bent into a shape including a pair of lateral legs 107 and a central U-shaped segment 109. Legs 107 are configured to project laterally outward and cooperate with rear braces 60 to pivotally attach spring 22 to rear wall 50 of pocket 28 (FIG. 4). Each set of rear braces 60 is further provided with a corresponding upper mounting flange 111 which opposes rear braces 60 to define an arcuate hollow 112 (FIG. 3) adapted to snugly engage the legs 107 of spring 22. The arcuate shape of hollow 112 is such that spring 22 is securely held against inadvertent removal therefrom, and yet still enables legs 107 to rotate for the pivoting of spring 22.

U-shaped segment 109 of spring 22 includes a pair of substantially parallel arcuate arms 113 interconnected by a bight segment 115 Bight segment 115 is, in turn, snugly engaged by trough 105 in projection 94 to effectively couple spring 22 to panel 18. Trough 105 is shaped to normally hold and retain spring 22, but will release upon the application of a sufficiently high force.

Figure 2:
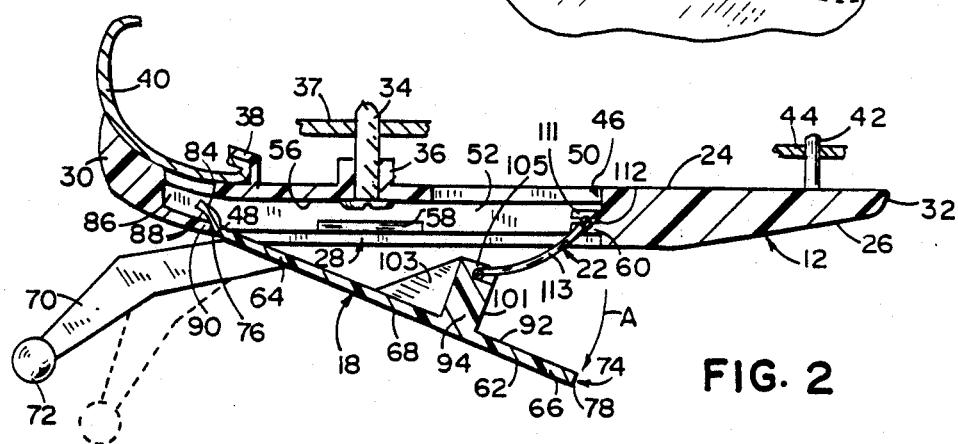
FIG. 2 is a cross-sectional view of the mounting assembly taken along section line II—II in FIG. 4 and shown in a breakaway position.

In the operative position (FIGS. 1, 3 and 4), spring 22 is in an overcenter position pushing forwardly on the upper end of projection 94 as seen by arrow F in FIG. 3 such that it tightly holds panel 18 against braces 58, 60 as discussed above. If mirror 20 is impacted by a forwardly directed force above a certain predetermined magnitude, panel 18 will pivot outwardly about front edge 76 and tongues 84 (FIG. 2). This initial movement is at first restricted by spring 22 as the U-shaped segment 109 is compressed through its center position. Any force below the predetermined level will not overcome the spring force and therefore will not displace or dislodge panel 18 and mirror 20. However, depending upon the specific magnitude of the impact above the predetermined level, panel 18 may pivot downwardly in a direction indicated by arrow A and be forced into a position shown in FIG. 2. It may be further dislodged such that tongues 84 are jostled out of openings 86, or may completely knock panel 18 from its engagement with base 12 and spring 22. In any event, when reassembling panel 18, projection 94 is first re-engaged with bight segment 115 of spring 22 if it had been dislodged therefrom. Secondly, panel 18 is oriented such that front edge 76 abuts front wall 48 and tongues 84 are received into openings 86. Thereafter, manual pressure is exerted on exterior face 68 near rear edge 78 of body 62 so that panel 18 is forced upwardly into pocket 84. Due to the overcenter arrangement of spring 22, panel 18 is snapped into place on braces 58, 60 to once again support the panel 18 and mirror 20 in a steady, secure manner.

The above description is that of a preferred embodiment of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A mounting assembly for a vehicular accessory comprising:
   a base adapted for attachment to an interior portion of a vehicle;
   a panel structure having means for mounting an accessory thereto, said panel structure being releasably connected to said base so that said panel structure is movable upon an impact of force above a certain predetermined magnitude from an operative position wherein said panel structure is tightly held against said base in a secure and steady manner to a release position wherein at least a portion of said panel structure is moved away from said base to thereby provide the assembly with breakaway capability;
   an overcenter spring pivotally coupled to said base and said panel structure to securely, but releasably, hold said panel structure in said operative position; and wherein said base further includes a recessed pocket defined by a peripheral border wall into which said panel structure is matingly received in said operative position, whereby said panel structure is securely held against lateral movement relative to said base when in said operative position.

2. The mounting assembly of claim 1 in which said base further includes flanges laterally extending from said border wall to abuttingly engage and support said panel structure against further movement within said pocket.

3. The mounting assembly of claim 2 in which said base further includes means positioned within said pocket a distance further than said laterally extending flanges for pivotally mounting said spring to said base.

4. The mounting assembly of claim 3 in which said panel structure further includes means for pivotally engaging said spring, wherein said engaging means is received into said pocket when said panel structure is in said operative position.

5. The mounting assembly of claim 4 in which said spring is a wire shaped to have a centrally generally U-shaped portion and a pair of laterally extending legs, wherein one of said U-shaped portion and said legs pivotally engages said engaging means of said panel structure and the other of said U-shaped portion and said legs pivotally engages said mounting means of said base.

6. The mounting assembly of claim 5 in which said U-shaped portion includes a pair of arcuate arms extending between said base and said panel structure and a bight portion interconnecting said arms and effecting the engagement of said spring with one of said base and said panel structure.

7. The mounting assembly of claim 2 in which said base further includes at least one opening in a forward portion of said border wall defining said pocket and in which said panel structure further includes at least one corresponding projection adapted to be received within said at least one opening when said panel is in said operative position, whereby said panel structure pivots about said at least one projection when released by a sufficient impact of force.

8. The mounting assembly of claim 7 in which said base further includes means for pivotally mounting said spring to a rearward portion of said border wall defining said pocket and in which said panel structure further includes means for pivotally engaging said spring, whereby said spring functions to resist said pivoting release motion of said panel structure.

9. The mounting assembly of claim 8 in which said spring is a wire shaped to have a centrally generally U-shaped portion and a pair of laterally extending legs, wherein one of said U-shaped portion and said legs pivotally engages said engaging means of said panel structure and the other of said U-shaped portion and said legs pivotally engages said mounting means of said base.

10. The mounting assembly of claim 9 in which said U-shaped portion includes a pair of arcuate arms extending between said base and said panel structure and a bight portion interconnecting said arms and effecting the engagement of said spring with one of said base and said panel structure.

11. The mounting assembly of claim 1 in which said spring is a wire shaped to have a centrally generally U-shaped portion and a pair of laterally extending legs, wherein one of said U-shaped portion and said legs pivotally engages said engaging means of said panel structure and the other of said U-shaped portion and said legs pivotally engages said mounting means of said base.

12. The mounting assembly of claim 11 in which said U-shaped portion includes a pair of arcuate arms extending between said base and said panel structure and a bight portion interconnecting said arms and effecting the engagement of said spring with one of said base and said panel structure.

13. The mounting assembly of claim 1 in which said base further includes at least one opening in a forward portion thereof and in which said panel structure further includes at least one corresponding projection adapted to be received within said at least one opening when said panel is in said operative position, whereby said panel structure pivots about said at least one projection when released by a sufficient impacting force.

14. The mounting assembly of claim 13 in which said base further includes means for pivotally mounting said spring to a rearward portion thereof and in which said panel structure further includes means for pivotally engaging said spring, whereby said spring functions due to its overcenter relationship to resist said pivoting release motion of said panel structure.

15. An overhead console with a breakaway accessory mount comprising:
   a base including a recess defined by a peripheral wall and means for mounting said base to the roof of a vehicle;
   a support member for an accessory and means for pivotally mounting said support member at a forward end thereof to said base, said support member extending into said recess and supported against lateral movement by said recess; and
   means for releasably coupling a rearward end of said support member to said base such that a forwardly directed impact force will cause said support member to pivot downwardly from said base.

16. The apparatus as defined in claim 15 wherein said releasable coupling means includes spring means.

17. The apparatus as defined in claim 16 wherein said spring means comprises a compression spring which operates as an overcenter spring to releasably hold the rearward end of said support member to said base.

18. The apparatus as defined in claim 17 wherein said means for pivotally mounting said support member also releasably couples said support member to said base.

19. The apparatus as defined in claim 18 wherein said support member includes means for attaching a rearview mirror thereto.

* * * * *